United States Patent [19]
Campbell, Jr.

[11] 4,304,961
[45] Dec. 8, 1981

[54] AUTHENTICATOR CODE GENERATOR

[75] Inventor: Carl M. Campbell, Jr., Newtown Square, Pa.

[73] Assignee: Burroughs Corporation, Detroit, Mich.

[21] Appl. No.: 126,284

[22] Filed: Mar. 3, 1980

[51] Int. Cl.³ .............................................. H04L 9/00
[52] U.S. Cl. ........................... 178/22.08; 340/825.34; 235/380
[58] Field of Search ...................... 235/379, 380, 382; 340/149 R, 149 A; 178/22, 22.08; 375/2; 364/200

[56] References Cited
U.S. PATENT DOCUMENTS

| | | | |
|---|---|---|---|
| 4,025,760 | 5/1977 | Trenkamp | 178/22 |
| 4,078,152 | 3/1978 | Tuckerman | 178/22 |
| 4,193,131 | 3/1980 | Lennon et al. | 340/149 R |

*Primary Examiner*—Howard A. Birmiel
*Attorney, Agent, or Firm*—Mark T. Starr

[57] ABSTRACT

A device for generating an authenticator code by encrypting the contents of a plain text message in accordance with a unique user supplied authenticator key variable. The device operates in two phases, the first of which processes every character in the plain text message and produces a first sequence of 16 check bits. The second phase processes this first 16 check bit sequence and transforms it into a second sequence of 16 check bits which may be utilized as an authenticator code.

15 Claims, 4 Drawing Figures

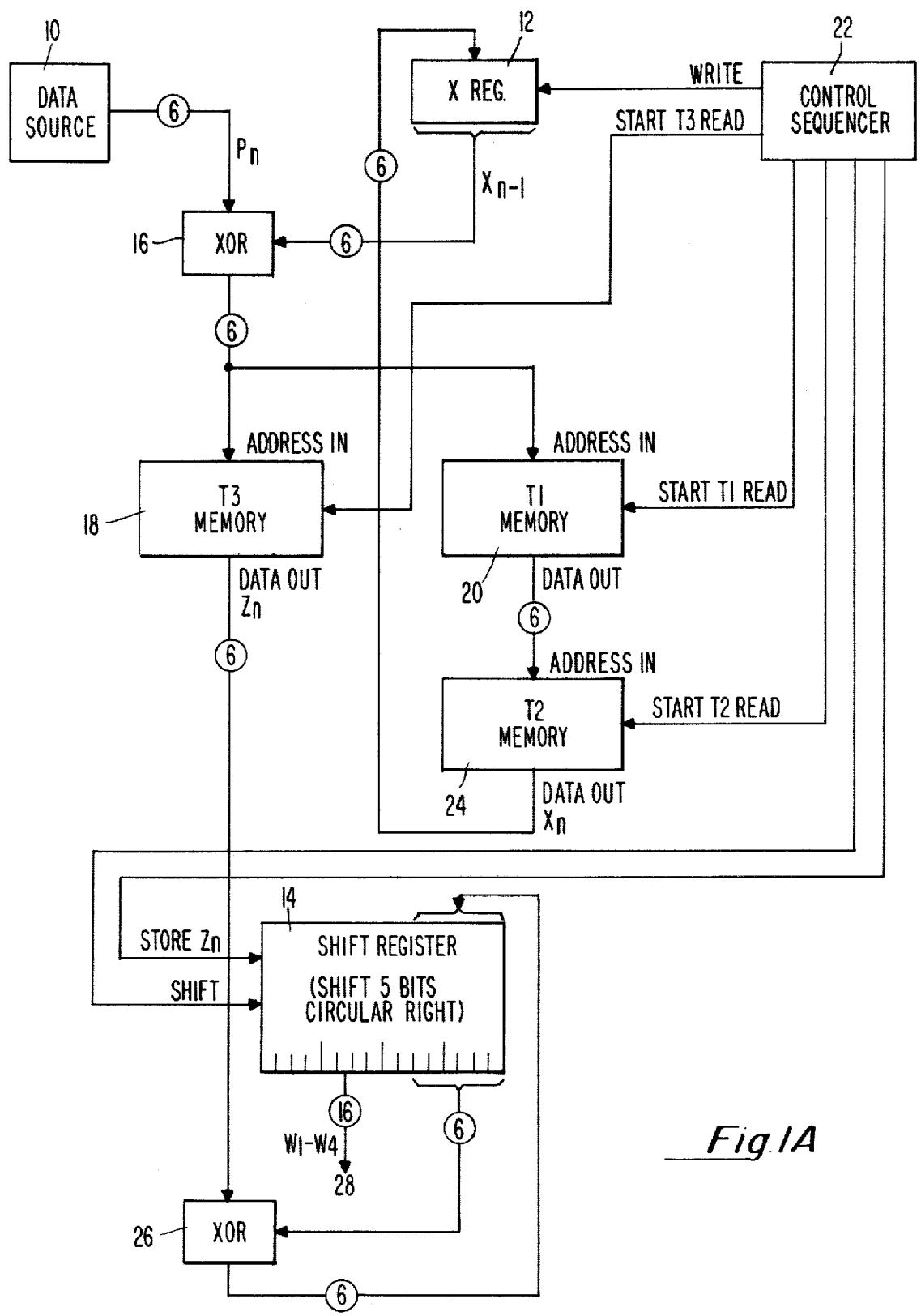
Fig. IA

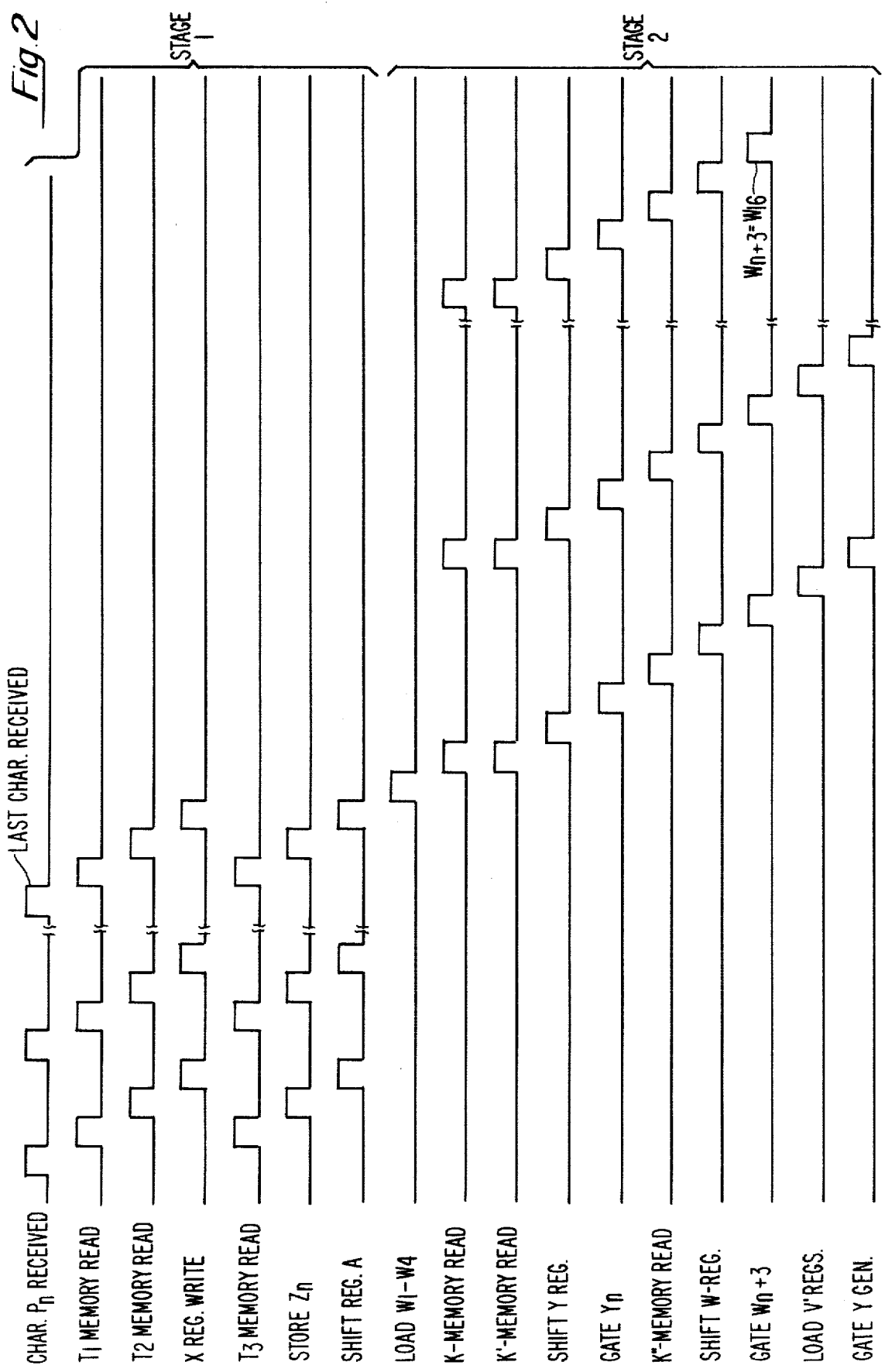

AUTHENTICATOR CODE GENERATOR

CROSS-REFERENCE TO RELATED APPLICATION

Reference is hereby made to U.S. Pat. application Ser. No. 128,667 of C. M. Campbell, Jr., filed Mar. 10, 1980, entitled Authenticator Device For Precluding Compensating Text Modifications In Transmitted Messages, and assigned to the same assignee as the present application.

BACKGROUND OF THE INVENTION

The present application relates in general to the art of cryptography and more specifically to hardware and techniques for achieving data communications security.

As the electronic transfer of information becomes more and more common, the need to safeguard this information becomes increasingly important. Many large corporations have data-communications systems over which they transmit, or would like to transmit, information of a sensitive nature, whose disclosure could be very detrimental to the corporation. In addition, the Federal Government is becoming increasingly concerned about insuring the individual's right of privacy. For this reason, the Government is already planning security provisions for its own widespread non-military communications networks. Government regulations of the future may impose similar security requirements upon the many types of non-governmental communications.

Perhaps most important of all is the evolution towards the "cashless society" in which transmitted data represents money. Even today many savings banks send monetary transactions through electronic data communications networks and are thus vulnerable to "electronic counterfeiting". Although it has apparently not yet occurred, a highly sophisticated "counterfeiter", with the ability to both monitor and insert data into the communications link, could manipulate such transactions to his advantage.

From the preceding discussion it is apparent that there are two aspects to communications security: confidentiality assurance and integrity assurance. Confidentiality assurance protects the transmitted data against comprehension by anyone who should tap the communications line. In other words, it provides "read" protection. Integrity assurance, on the other hand, protects the transmitted data against being intercepted, modified, and then retransmitted in such a way that the final recipient of the message will receive an intelligible and apparently valid message but one which has in fact been modified. In other words, this aspect of security provides "write" protection.

Properly designed cryptographic equipment can provide for both of these aspects of security. Encryption by its very nature transforms data into an unintelligible form; hence, all well-designed cryptographic equipment provides confidentiality assurance. Although many encryption techniques do not assure integrity, there are cryptographic techniques known which assure both confidentiality and integrity. Typical of such techniques is that disclosed in U.S. Pat. No. 4,159,463, entitled "Communications Line Authentication Device", which is assigned to the same assignee as the present application. Such encryption techniques have the characteristic that any change to any character of the cipher (encrypted traffic) causes subsequent characters of the plain-text (decrypted message) to become garbled (rendered unintelligible). This characteristic is called "garble extension". Therefore, it is possible to develop cryptographic equipment which provides for both of these aspects of security by basing this equipment on an encryption technique which is highly secure and which has the "garble extension" property.

In the prior art, many banks utilized test keys to aid security on telex transfers. In such a case, a bank issues test key procedures to their correspondents with one or more components of those procedures being unique to each correspondent. Components of the message are used in various arithmetical calculations, often including table look-up functions. The numeric result of the calculations is added to the message as a test key (or authenticator code). The receiver checks the test key by performing the same calculations and using the same components of the message.

An advance over the prior art came in the form of an authenticator device which is somewhat similar to such a test key calculation but offers a level of security many, many times higher. In an authenticator device, the entire message text is used in the calculations and the calculations are based on an algorithm of great complexity. The same algorithm is used by all communicating banks. However, the algorithm also requires an authenticator key variable for its calculations. An authenticator key variable will be agreed upon between two correspondent banks and will not be known to any other party. This unique authenticator key variable ensures that the result of the algorithm can only be generated and/or checked by the sending and receiving banks.

The result of the algorithm, the authenticator code, is added to the trailer of the message. The receiving bank is able to check the authenticator result by using the common algorithm and the unique authenticator key variable agreed to with the sending bank.

In a typical modern communications system where it is desired to verify the integrity of transmitted messages, authenticator devices are normally inserted at both transmitting and receiving ends of the communications line. At the transmitter end, the authenticator device receives a plain text message from the communications line, generates an authenticator code by encrypting the plain text message received and retransmits the plain text message received, with the authenticator code appended thereto, onto the communications line.

At the receiver end, the authenticator device receives the message from the communications line, generates an authenticator code by encrypting the plain text portion of the message received and compares the authenticator code generated with the authenticator code appended to the plain text portion of the message received. If the two authenticator codes are identical, the plain text message has been received exactly as it was transmitted. If the two authenticator codes differ, either an error occurred during transmission of the message or the message has been altered during transmission; viz, the integrity of the message is in doubt.

The authenticator code generator of the present invention operates in two stages. The first stage processes every character in the message and produces a first sequence of 16 check bits called a residue. The primary purpose of the first stage is to preclude "compensating changes"; viz a fraudulent change in the message text associated with another change which has a reasonable probability of compensating for the first change in such a way that the authenticator code of the original message would be valid for the modified message. The second stage processes this 16 bit residue and transforms it, in a highly complex manner, into a second sequence of 16 check bits (the authenticator code). The primary purpose of the second stage is to prevent determination of the authenticator key variable by cryptoanalytical techniques.

The generator provides a very high degree of security against the two above mentioned threats to which the generator is exposed: compensating text modifications, and cryptoanalytical key determination. The former requirement is in many ways the more difficult to fulfill, as many generators for which the key variable is virtually impossible to determine can be circumvented by making compensating text modifications. In such case, the would-be counterfeiter can make a simple change in the text (perhaps to the leading digit of an amount field), and then, from a knowledge of the device's operation but not the key variable, determine another change which has a reasonable probability of compensating for the first change so that the original authenticator code is still valid. It is an object of the present invention to be immune to this threat by providing a generator wherein any text modification or combination has only one chance in 65,536 of having the original authenticator code still valid.

The second threat to which an authenticator code generator is exposed is determination of the key variable. The present invention has a "work factor" in excess of $2 \times 10^{13}$. The only way to determine a given key variable is by a trial-and-error process of trying all possible keys until the proper one is found. Assuming a very high speed computer which could simulate the authentication code generation apparatus of the present invention so as to process a text character in an average of only 1 microsecond and assuming 150 characters per message, such a computer, operating 24 hours per day, 7 days per week, would require the average of at least 50 years to determine a single authenticator key variable. Possession of a very large number of messages would provide no additional information which could reduce the time for this process.

It is the general object of this invention to provide an improved authenticator code generator for generating a unique authenticator code from the text of a received message.

It is a further object of this invention to provide an improved authenticator code generator for generating a unique authenticator code which is dependent on a key variable stored in the authenticator code generator and the text of a received message.

It is still another object of this invention to provide an authenticator code generation device which provides a very high degree of security against determining the authenticator key variable by cryptoanalytical techniques.

Further, it is an object of this invention to provide an authenticator code generation device which precludes the undetected introduction of compensating type changes in a message.

These and other objects, features and advantages of the present invention will become apparent from the description of the preferred embodiment of the invention when read in conjunction with the drawings contained herewith.

SUMMARY OF THE INVENTION

This is an authenticator code generation device for encrypting the contents of a plain text message in accordance with a 16 digit authenticator key (variable) and producing a first sequence of 16 check bits (or residue) which is then transformed into another 16 bit value which may be used as an authenticator code.

The device includes two processing stages. The first stage sequentially processes each 6-bit character of the message text within the internal registers of the first stage and produces a first sequence of 16 check bits which is called the residue or first residue. The primary purpose of this first stage is to preclude compensating changes in the message text. As each character is received, it is modulo-2 combined with the contents of a first register and the result is used to simultaneously address first and second memories, the values stored in the first memory consisting of a specified permutation of the values 0–63, the values stored in the second memory consisting of non-linear transformations of the 16 digit authenticator ces the value previously stored in the first register. The data read out of the first memory is exclusive-OR'ed into the 6 low order bit positions of a first 16 bit shift register. The first shift register is then shifted circular, right, 5 bit positions. The same stage one processing is repeated for each character of the message, after which the 16 bit residue (or first sequence of check bits) remaining in the first shift register is transferred to stage 2 for further processing.

The second stage processes the 16 bit residue received from the first stage and transforms it into another (or second) sequence of 16 check bits which is the authenticator code. The primary purpose of the second stage is to prevent determination of the authenticator key variable by cryptoanalytical techniques. The first stage residue is stored in a second shift register. At the start of stage 2 processing, the contents of second and third four bit registers are combined modulo-2 with first and third four bit bytes read from a third 16-bit shift register in second and third exclusive-OR gates, respectively. The four bit outputs of the second and third exclusive-OR gates are used to access two of the 16 digits making up the authenticator key variable. The two 4 bit digits of the authenticator key variable are combined modulo-2 with the contents of a fourth four-bit register and the high order 4 bits of the second shift register, respectively, and the results are again combined in another exclusive-OR gate, the output of which is stored in the low order four bit positions of the third shift register after first shifting the contents of the third shift register 4 bit positions left. Next, the contents of a fifth four bit register is combined modulo-2 with the contents of the next to the highest four bit positions of the third shift register and the result is used to select one digit of the sixteen digit authenticator key variable. The digit selected is combined modulo-2 with the contents of a sixth four bit register and that result is combined modulo-2 with the low order 4-bit positions of the third shift register. The result is next t positions left.

Next, a selected series of nonlinear transformations are performed on the second through sixth registers inclusive, the transformations performed being responsive to the value last stored in the low order four bit positions of the second shift register. After the second through sixth registers have been updated, another iteration commencing with the modulo-2 combination of the second and third registers with the first and third four bit bytes of the third shift register, respectively, is begun. Second stage processing continues until a total of twelve iterations have been completed, at which time the generated authenticator code (or second sequence of check bits) is available in the second shift register.

BRIEF DESCRIPTION OF THE DRAWINGS

FIGS. 1A–1C is a schematic block diagram of the authenticator code generation device.

FIG. 2 is a timing diagram showing the control signals generated by the control sequencer utilized in the authenticator code generation device.

DESCRIPTION OF THE PREFERRED EMBODIMENT

Figure 1B:
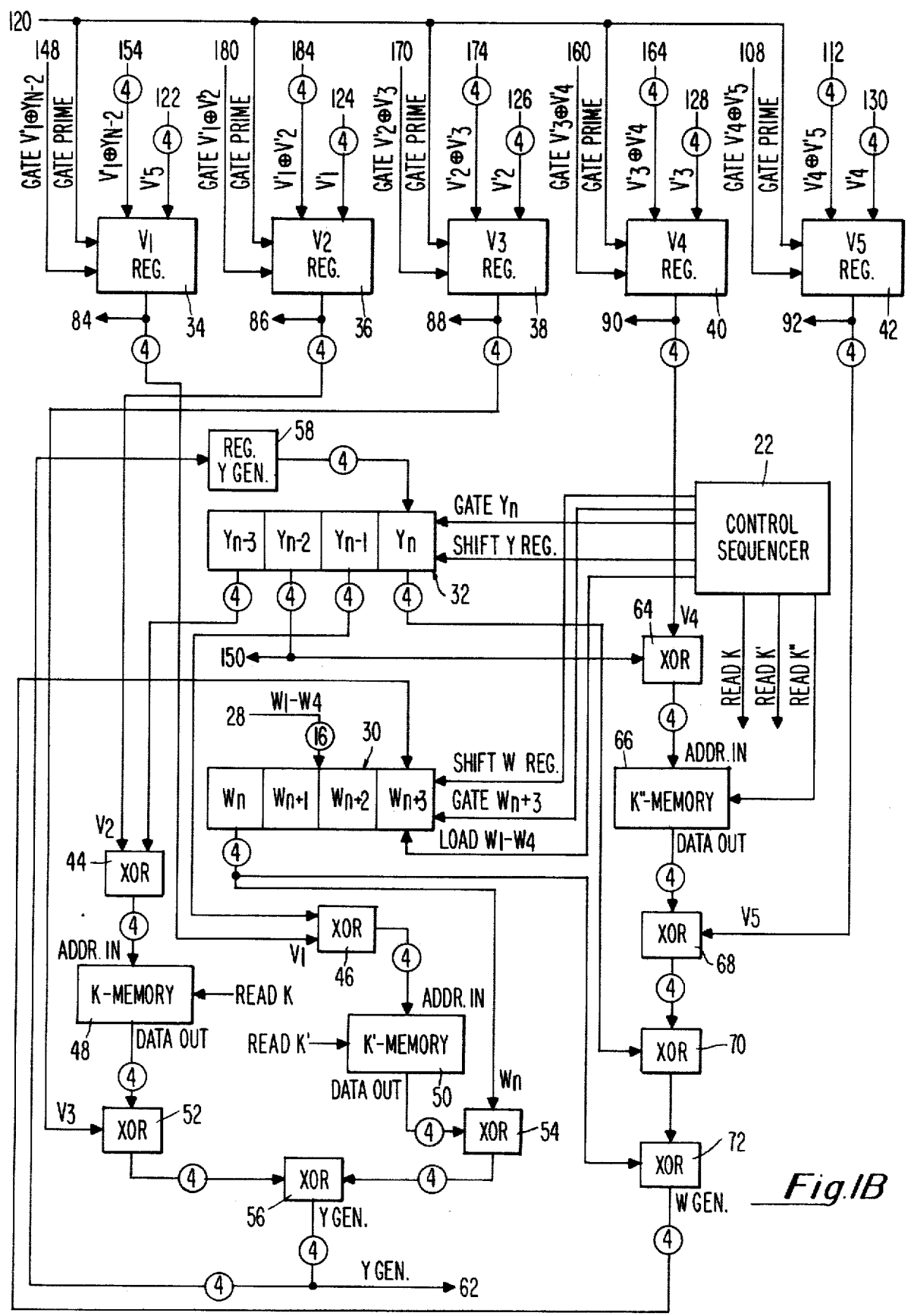

The authenticator code generation system shown in FIG. 1 processes an n character message in accordance with the the timing control diagram of FIG. 2. The authenticator code generation system consists of two stages. The first stage processes the message text and produces a first sequence of 16 check bits (or residue). The second stage processes this residue and transforms it into a second sequence of 16 check bits which is used as the authenticator code.

For the purposes of facilitating the understanding of the invention, the following terms and elements are defined as follows:

K, K', K", T1, T2 and T3 are tables, implemented in the form of memories, the tables' contents defined as follows:

In the preferred embodiment, the K' and K" memories 50 and 66 are actually the same as K memory 48 and are shown as different memories only to simplify an understanding of the invention. The K memory 48 functions as a 16 entry table, 4 bits per entry, consisting of a permutation of the hexadecimal digits 0–F. The K memory 48 is used to store the 16 digit, 4 bits per digit, authenticator key variable and is thus a secret table.

T1 functions as a 64 entry table with six bits per entry, with the following values:

| | |
|---|---|
| T1(1) = 00 K(1) | Note that T(i) is the "ith" |
| T1(2) = 01 K(1) | entry in a table, and K(i) |
| T1(3) = 10 K(1) | is the "ith" digit of the |
| T1(4) = 11 K(1) | 16-digit authenticator key variable. |
| T1(5) = 00 K(2) | |
| . | |
| . | |
| T1(64) = 11 K(16) | |

T2 functions as a 64 entry table, 6 bits per entry, consisting of a specified permutation (chosen by the user) of the T3 functions as another 64 entry table, 6 bits per entry, consisting of another specified permutation (chosen by the user) of the values 0 through 63. This table is not secret.

$P_n$ is the "nth" plain text character of the message to be included in the authenticator code generation. It is a 6 bit character.

Referring now to FIG. 1A, prior to receiving any of a message's plain text characters $P_n$ from the data source 10, the contents of X-Register 12 and shift register 14 are initialized to zero. At the same time, the T1 memory 20 is loaded with the 16 digit authenticator key variable contained in the K memory 48 (by means not shown) and thus initialized to the values given in the definitions. As each plain text character $P_n$ of the message is received from data source 10, it is combined with the contents of X-register 12 modulo-two fashion in a device such as exclusive-OR gate 16. The product formed at the output of exclusive-OR gate 16 provides the address input to both the T1 memory 20 and the T3-memory 18. Referring now to the timing diagram of FIG. 2 and noting that the timing diagram neglects signal propagation and memory access time delays, with the output of exclusive-OR gate 16 providing an address at the inputs of both memories 18 and 20, a read cycle is initiated at each of these memories under control of the control sequencer 22.

The design of the required control sequencer 22 will be obvious to those skilled in the art from the discussion to follow and particularly by making reference to FIG. 2, which shows the timing signals generated by the control sequencer 22. The control sequencer 22 controls the sequencing of the various elements included in the preferred embodiment of the invention. Among the possibilities for implementing the control sequencer 22 is the use of a microprocessor.

The data read out of the T1-memory 20 serves as the address input to the T2-memory 24. With the data output of the T1-memory 20 available as the address input to the T2-memory 24, the control sequencer 22 initiates a read cycle to the T2-memory 24. The data read out of T2-memory 24 is then stored in X-register 12 under control of the WRITE signal from control sequencer 22.

The data read out of T3-memory 18 is combined with the six low order bits from shift register 14 in exclusive-OR gate 26 and the resulting product produced at the output of exclusive-OR gate 16 is used to replace the previous six low order bit positions of shift register 14 under control of the STORE $Z_n$ signal from control sequencer 22. Next, the contents of shift register 14 are shifted circular, right, 5 bit positions in response to the SHIFT signal from control sequencer 22.

At this point, the first stage processing of one message character $P_n$ has been completed. As shown in FIG. 2, the same process is repeated as each message character $P_n$ is provided by data source 10, the only exception being that neither X-register 12 or shift register 14 is cleared as long as the same message is being processed. After the last character $P_n$ in the n-character message has been processed, the 16 bit residue (or first sequence of check bits) produced by the first stage is available in shift register 14. For ease of discussing the second stage of the authenticator code generation system, the first 16 check bit sequence (or residue) produced by the first stage may be considered as four 4-bit hexadecimal digits identified as W1, W2, W3, and W4, W1 through W4 corresponding to the highest through the lowest order 4 bit groups in shift register 14, respectively.

Referring now to FIG. 1B, in the preferred embodiment of the invention, at the start of stage 2 processing shift register 32 has been initialized to the value zero and registers 34, 36, 38, 40, and 42 have each been preset to a different user chosen value between decimal 1 and decimal 5 (by means not shown). Referring now to the timing diagram of FIG. 2, after the last character $P_n$ has been received and processed by the first stage, the residue W1-W4 remaining in shift register 14 is transferred to register 30 via link 28 and stored in register 30 in response to the LOAD W1-W4 signal from control sequencer 22.

Next, the contents of register 36 and the leftmost four bits of shift register 32, identified as $Y_{n-3}$, is combined by exclusive-OR gate 44 and the output of exclusive-OR gate 44 provided as the address input to the K-memory 48 which contains the secret 16-digit authenticator key variable. At the same time, the contents of register 34 and the four bit positions of shift register 32 identified as $Y_{n-1}$, is combined by exclusive-OR gate 46 and the output of exclusive-OR gate 46 provided as the address input to the K'-memory 50, the K'-memory 50 being the equivalent of the K-memory 48. At this time, the control sequencer 22 initiates a read operation to both the K-memory 48 and the K'-memory 50.

The authenticator key variable digit read out of the K-memory 48 is combined in exclusive-OR gate 52 with the contents of register 38. At the same time, the authenticator key variable digit read from the K' memory 50 is combined in exclusive-OR gate 54 with the leftmost four bits of shift register 30, identified as $W_n$. The product output from exclusive-OR gates 52 and 54 is then combined in exclusive-OR gate 56 and the result is entered into registers 58 and 60 (FIG. 1C), both of which in the preferred embodiment of the invention are characterized as having latched outputs.

Next, the control sequencer 22 sends the SHIFT LEFT OUT signal to shift register 32, thus causing the contents of register 32 to shift four bit positions left, after which the contents of register 58 are gated into the low order 4-bit positions of shift register 32 in response to the GATE $Y_n$ signal from control sequencer 22. The new contents of the four bit positions of register 32 labeled $Y_{n-2}$ are then combined in exclusive-OR gate 64 with the contents of register 40 and the output of exclusive-OR gate 64 is used as the address input to K"-memory 66. Next, the control sequencer 22 initiates a read operation to the K"-memory address provided by the output of exclusive-OR gate 64 by raising the READ K" control signal. The authenticator key variable digit read out from the K"-memory 66 is combined with the contents of register 42 in exclusive-OR gate 68 and that result is combined in exclusive-OR gate 70 with the right-most four bits of shift register 32, identified as $Y_n$. Next, the output of exclusive-OR gate 70 is inputted to exclusive-OR gate 72 along with the high order four bit positions of shift register 30, identified as $W_n$. Next the contents of register 30 are shifted four bit positions left in response to the SHIFT W-REG signal from control sequencer 22 and the previously generated output of exclusive-OR gate 72 is stored in the four low order bit positions of register 30, identified as $W_{n+3}$, in response to the GATE $W_{n+3}$ signal from control sequencer 22.

Figure 1C:
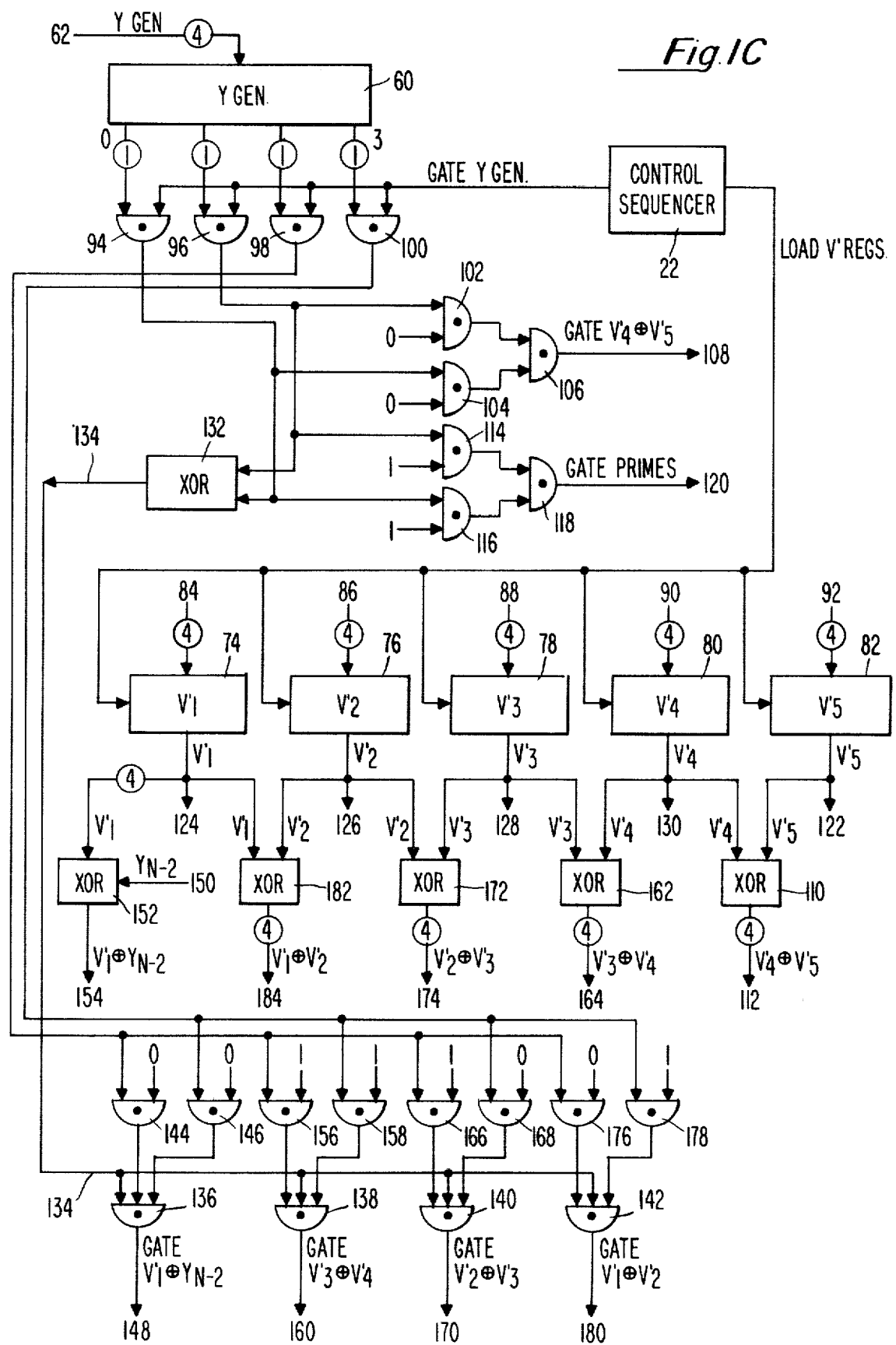

As previously noted, the output of exclusive-OR gate 56 was also transferred via line 62 to register 60 (FIG. 1C). Each time a new value is stored in register 60, a series of transformations are performed on the then current values in registers 34–42, with the result that the transformed values replace the previous values prior to the next access to the K-memory 48.

Thus, referring now to FIG. 1C and the timing diagram of FIG. 2, after the new value of $W_{n+3}$ is loaded in register 30, the control sequencer 22 activates the LOAD V' REGS signal which gates the contents of registers 34, 36, 38, 40, and 42 into corresponding registers 74, 76, 78, 80, and 82, respectively via links 84, 86, 88, 90, and 92 respectively. Next the control sequencer 22 activates the GATE YGEN signal which gates the contents of register 60 through AND circuits 94, 96, 98, and 100 and into the update transformation network appearing in FIG. 1C.

The outputs of AND gates 94 and 96 which correspond to the contents of register 60 bit positions 0 and 1, respectively, are first tested to see if they are either binary "00" or "11". Thus, if the two high order bits in register 60 are "00", AND gates 102 and 104 will both be made and this in turn will make AND gate 106, thus activating the GATE $V'_4 \oplus V'_5$ signal which is sent to register 42 (FIG. 1B) via link 108. Again referring to FIG. 1C, the contents of the $V'_4$ register 80 and $V'_5$ register 82 are combined in exclusive-OR gate 110 and the output of exclusive-OR gate 110 is transferred to the input of register 42 via link 112. Thus, when the GATE $V'_4 \oplus V'_5$ signal 108 is received by register 42, the $V'_4 \oplus V'_5$ data sent on gisters 34, 36, 38, 40 and 42 (FIG. 1B) via link 120. Again referring to FIG. 1C, upon receipt of the GATE PRIME signal via line 120 at registers 34, 36, 38, 40 and 42, each of the respective registers 34–42 will read in the data on input lines 122, 124, 126, 128, 130, respectively, the data on lines 122–130 corresponding to the contents of registers 82, 74, 76, 78 and 80, respectively.

If the two high order bits in register 60 are neither "11" or "00", then exclusive-OR gate 132 will be made, thus enabling link 134 which is connected as one of the inputs to each of AND gates 136, 138, 140 and 142. In such case, the transformation network will then decode the outputs of AND gates 98 and 100 which correspond to the contents of register 60 bit positions 2 and 3. Thus if bit positions 2 and 3 of register 60 are "00", AND gates 144 and 146 will both be made, and this in turn will make AND gate 136, thus activating the GATE $V'_1 \oplus Y_{n-2}$ signal which is sent to register 34 via link 148. Again referring to FIG. 1C, the contents of the $Y_{n-2}$ bit positions of register 32 (FIG. 1B) and register 74 are combined in exclusive-OR gate 152 and the output of exclusive-OR gate 152 is transferred to the input of register 34 via link 154. Thus, when the GATE $V'_1 \oplus Y_{n-2}$ signal 148 is received by register 34, the $V'_1 \oplus Y_{n-2}$ data sent on link 154 is stored in register 34.

If bit positions 2 and 3 of register 60 are "11", AND gates 156 and 158 will both be made, and this in turn will make AND gate 138, thus activating the GATE $V'_3 \oplus V'_4$ signal which is sent to register 40 (FIG. 1B) via link 160. Again referring to FIG. 1C, the contents of registers 78 and 80 are combined in exclusive-OR gate 162 and the output of exclusive-OR gate 162 is transferred to the input of register 40 via link 164. Thus, when the GATE $V'_3 \oplus V'_4$ signal 160 is received by register 40, the $V'_3 \oplus V'_4$ data sent on link 164 is stored in register 40.

If bit positions 2 and 3 of register 60 are "10", AND gates 166 and 168 will both be made, and this in turn will make AND gate 140, thus activating the GATE $V'_2 \oplus V'_3$ signal which is sent to register 38 (FIG. 1B) via link 170. Referring now to FIG. 1C, the contents of registers 76 and 78 are combined in exclusive-OR gate 172 and the output of exclusive-OR gate 172 is transferred to the input of register 38 via link 174. Thus, when the GATE $V'_2 \oplus V'_3$ signal 170 is received by register 38, the $V'_2 \oplus V'_3$ data sent on link 174 is stored in register 38.

Lastly, if bit positions 2 and 3 of register 60 are "01", AND gates 176 and 178 will both be made, and this in turn will make AND gate 142, thus activating the GATE $V'_1 \oplus V'_2$ signal which is sent to register 36 (FIG. 1B) via link 180. Referring to FIG. 1C, the contents of registers 74 and 76 are combined in exclusive-OR gate 182, and the output of exclusive-OR gate 182 is transferred to the input of register 36 via link 184. Thus, when the GATE $V'_1 \oplus V'_2$ signal 180 is received by register 36, the $V'_1 \oplus V'_2$ data sent on link 184 is stored in register 36.

With the above described update transformation of the contents of registers 34-42 completed, a cycle counter (not shown) in the control sequencer 22 is updated to reflect the completion of one iteration of stage 2 processing. Under control of the control sequencer 22, stage 2 processing continues with additional iterations starting with accesses to memories 48 and 50 followed by the other previously discussed stage 2 operations shown in the timing diagram of FIG. 2, the completion of each iteration incrementing the cycle counter by a value of one. In the preferred embodiment of the present invention, stage 2 processing continues until a value of 12 is detected in the cycle counter (by means not shown) at which time the authenticator code generation is complete. At such time, the sixteen check bit authenticator code generated is available in register 30.

While the invention has been particularly shown and described with reference to the preferred embodiment thereof, those skilled in the art will realize that various omissions, substitutions and changes in forms and details of the present invention may be made without departing from the spirit and scope of the invention. For example, the number of iterations performed in stage 2 may be increased or decreased. Furthermore, the memories 48, 50 and 66 need not be separate memories as they all contain the same 16-digit secret authenticator key variable and this key variable is not altered during the generation of an authenticator code.

It should also be recognized by those skilled in the art that, while the specific embodiment disclosed herein for carrying out the authenticator code generation is a hardware structure, the concepts presented are capable of being implemented by program means executable on either a special purpose or a general purpose computer. The selection of hardware or software means is a tradeoff decision dependent on cost-performance factors. It is the intention, therefore, to be limited only as indicated by the scope of the following claims.

What is claimed is:

1. A system for generating an authenticator code for a message comprised of n plain text characters under control of an authenticator key, said authenticator code key variable comprised of a sequence of k digits, selected ones of said k digits for controlling various operations within said system, each of said n plain text characters having p digits, each of said k digits composed of q binary digits, said system comprising:
   first stage processing means, sequentially responsive to each of said n plain text characters, said first stage processing means for carrying out a plurality of linear and non-linear transformations on each of said n plain text characters, whereby the combined transformation executed on cond stage processing means for encrypting said first residue as a function of said authenticator key, whereby the encryption process performed on said first residue develops said authenticator code, said authenticator code including a second sequence of check digits generated as a result of the encryption process performed on said first residue.

2. The system in accordance with claim 1 wherein said first stage processing means comprises:
   transform means, responsive to each character of said n character message, said transform means for transforming each of said n characters as a function of said authenticator key, whereby a transformed character $z_n$ is generated for each of said n characters of said message;
   means for storing said first residue; and
   means connected to said transform means and said first residue storage means, for combining each of said transformed characters $Z_n$ with information contained in said first residue storage means and substituting the combined result back into said first residue storage means.

3. The system in accordance with claim 2 wherein said second stage processing means comprises:
   second stage storage means, connected to said first residue storage means, said second stage storage means for storing said generated authenticator code; and
   means, connected to said second stage storage means, said means for generating a plurality of transformed signals, WGEN, that are a function of said first residue and selected digits of said k digit authenticator key, said means further for storing said generated signals WGEN in selected bit positions of said second stage storage means.

4. The system in accordance with claim 3 wherein said transform means includes:
   first combining means for combining each of said n characters with information contained in a writable storage unit;
   third addressable storage means, connected to and receiving its address input from said first combining means, said third addressable storage means for storing the transformed characters $Z_n$; and
   feedback means, receiving its input from the output of said first combining means, said feedback means for generating and storing a new value in said writable storage unit after each of said n characters is combined with the information contained in said writable storage unit.

5. The system in accordance with claim 4 wherein said feedback means comprises:
   first addressable storage means, receiving its address input from the output of said first combining means, said first addressable storage means for storing a first set of entries which are a function of said k-digit authenticator key;
   second addressable storage means, receiving its address input from the output of said first addressable storage means, said second addressable storage means for storing a second set of entries; and
   transfer means, connected between said second addressable storage means and said writable storage unit, said transfer means for storing entries read from said second addressable storage means in said writable storage unit.

6. The system in accordance with claim 5 wherein said first residue storage means includes a shift register, the input to said shift register connected to an output of said transformed character combining means, the output of said shift register providing an input to said transformed character combining means.

7. The system in accordance with claim 6 wherein said transformed character combining means includes an exclusive-OR circuit, said exclusive-OR circuit for combining the data output of said third addressable storage means and information contained in said shift register.

8. The system in accordance with claim 3 wherein said transformed character combining means further includes means for circularly shifting the contents of said first residue storage means.

9. The system in accordance with claim 4 wherein said first combining means includes a second exclusive-OR circuit, said second exclusive-OR circuit for combining each of said n plain text characters with the information contained in said writable storage unit.

10. The system in accordance with claim 3 wherein said means for generating said plurality of transformed signals, WGEN, comprises:
means for generating a plurality of transformed signals, YGEN, that are a function of the information contained in said second stage storage means and selected digits of said k digit authenticator key;
third stage storage means for storing said generated transformed signals YGEN; and
fourth means for performing a plurality of non-linear transformations on information contained in said thirresponsive to selected digits of said k digit authenticator code, whereby said signals WGEN are produced.

11. The system in accordance with claim 10 wherein said means for generating said plurality of transformed signals, YGEN, i
first means for performing a modulo addition on information contained in said first register and information contained in said third stage storage means, and further for using the result thereof to select a first key digit from said k-digit authenticator key;
second means for performing a modulo addition on information contained in said second register and said third stage storage means, and further for using the result thereof to select a second key digit from said k-digit authenticator key; and
third means for performing a plurality of modulo additions on information contained in said second stage storage means, said third register and said first and said second key digits, whereby said plurality of signals YGEN is produced.

12. The system in accordance with claim 11 further including means for storing said produced plurality of signals YGEN in said third stage storage means.

13. The system in accordance with claim 11 wherein said fourth means includes:
fourth and fifth registers;
fifth means for performing a modulo addition on information contained in said third stage storage means and said fourth register, and further for using the result thereof to select a third key digit from said k-digit authenticator key; and
sixth means for performing a plurality of modulo additions on information contained in said second stage storage means, information contained in said third stage storage means and said third key digit, whereby said plurality of signals WGEN is produced.

14. The system in accordance with claim 13 further including means for storing said produced plurality of signals WGEN in said second stage storage means.

15. The system in accordance with claim 13 further including update means, responsive to said produced plurality of signals WGEN, said update means including a plurality of logic means interposed between said third means and said first through sixth registers inclusive, said update means for modifying the contents of selected ones of said first through fifth registers inclusive.

* * * * *